Feb. 2, 1954

W. J. PARKS

2,667,689

METHOD OF MAKING BEARING MOUNTINGS

Filed Oct. 14, 1950

INVENTOR.
WALTER J. PARKS

BY Fay, Golrick & Fay

ATTORNEYS

Feb. 2, 1954 W. J. PARKS 2,667,689
METHOD OF MAKING BEARING MOUNTINGS
Filed Oct. 14, 1950 6 Sheets-Sheet 2

INVENTOR.
WALTER J. PARKS
BY Fay, Gobrick & Fay
ATTORNEYS

Feb. 2, 1954                 W. J. PARKS                 2,667,689
                     METHOD OF MAKING BEARING MOUNTINGS
Filed Oct. 14, 1950                                6 Sheets-Sheet 3

INVENTOR.
WALTER J. PARKS
BY Fay, Golrick & Fay
ATTORNEYS

Feb. 2, 1954

W. J. PARKS 2,667,689

METHOD OF MAKING BEARING MOUNTINGS

Filed Oct. 14, 1950

INVENTOR.
WALTER J. PARKS

BY Fay, Gobrick & Fay

ATTORNEYS

Feb. 2, 1954 — W. J. PARKS — 2,667,689
METHOD OF MAKING BEARING MOUNTINGS
Filed Oct. 14, 1950 — 6 Sheets-Sheet 6

INVENTOR.
WALTER J. PARKS
BY Fay, Golrick & Fay
ATTORNEYS

Patented Feb. 2, 1954

2,667,689

UNITED STATES PATENT OFFICE 2,667,689

METHOD OF MAKING BEARING MOUNTINGS

Walter J. Parks, Aurora, Ohio

Original application June 26, 1948, Serial No. 35,433, now Patent No. 2,532,327, dated December 5, 1950. Divided and this application October 14, 1950, Serial No. 192,098

3 Claims. (Cl. 29—148.4)

The present invention, relating as indicated to a bearing mounting structure and method of forming the same, is more particularly directed to the provision of a structure or unit for use with either sleeve or anti-friction bearings and which will simplify the installation of the bearing elements either into a housing or onto a shaft and at the same time eliminate some of the precision workmanship now necessary on the parts in which or on which the bearing is mounted. The mounting structure also provides a definite means permitting the bearing to align itself laterally, that is axially with respect to the location of the inner race on the shaft and the outer race in its housing, for example, so that undue axial thrust loads will not cause an overloaded condition and produce rapid failure of the bearing. The present application is a continuation-in-part of application Serial No. 759,071 filed July 5, 1947 now abandoned and a division of Parks Serial No. 35,433 filed June 26, 1948, now Patent 2,532,327, dated December 5, 1950.

In anti-friction bearings, and particularly the ball or roller types in which both radial and axial loads are carried by the bearing, it is frequently possible, if the bearing is fitted too tightly in its supporting housing, to produce in an axial direction extraordinary pressures between the races and the balls or rollers, resulting in overheating, increased frictional resistance and sometimes in rapid destruction of the bearings. The final result of such difficulty is, of course, the failure of the bearing and consequently the rendering of the entire machine in which the bearing is mounted unfit for service until the bearing is replaced. An object of the present invention is to provide a mounting structure for bearings which will permit axial movement of the bearing relative to its supporting housing or member responsive to axial thrusts on the bearing before such thrust pressures deleteriously effect the bearing while at the same time providing a relatively rigid resistance to radial movement of the bearing relative to its support.

A further purpose served by the present invention is to prevent turning of the race on its mating part, that is the outer race with respect to the housing or the inner race with respect to the shaft due to any loose fit which might otherwise be necessary in order to permit the axial alignment of the bearings and the parts thereof.

A further object of the invention is the provision of a bearing assembly which has a degree of axial flexibility which will permit the use of two or more bearings between a housing and shaft which shall be capable of accommodating slight irregularities and inaccuracy of manufacture. The entire assembly having substantially no radial flexibility and a comparatively large amount of axial flexibility, both of which are capable of control by proper selection of materials, assembly and lubrication.

It is also an object of the invention to provide a bearing mounting unit which can be used with standard bearings for providing axial displacement of the bearings relative to its support to relieve excessive axial thrust loads.

A still further object of the invention is to provide a method of forming a bearing mounting unit which is economical and which will be efficient in operation.

To the accomplishment of the foregoing and related ends, said invention, then, consists of the means hereinafter fully described and particularly pointed out in the claims; the annexed drawings and the following description setting forth in detail certain structure embodying the invention, such disclosed means constituting, however, but one of various structural forms in which the principle of the invention may be used.

The present invention in its simplest form is shown in Figs. 3, 4, 5, 18 and 19. In these Figures there is an outer collar 10 and an inner collar or annulus 11 which, in a basic form, can represent or constitute the outer race of an anti-friction bearing assembly of which the inner race and the anti-friction members are not shown. In the case of a sleeve bearing (as in Figs. 18 and 19) the inner surface of member 11 is the bearing itself and the terms "bearing element" or "inner race" as used herein are intended to include a sleeve bearing and/or an inner race member. Interposed more or less compactly between spaced concentric inner and outer elements 10 and 11 is a coil 12 of thin strip in the nature of a ribbon, usually of metal, wound about the inner member 11 to the desired thickness to be tightly fitted into the outer element 10 so that the three members when so assembled represent a unit capable of being handled, shipped and assembled without accidental disassembly and in which the intermediate coil 12 forms substantially a solid element or body (viewed radially between the members 10 and 11. At its outer end the coil of ribbon 12 may be secured to the member 10 and may, at its inner end, be secured to the member 11, although in many cases it is sufficient to rely on a roughened surface to fix the coil.

This unit as thus described forms the basis for the various adaptations and assemblies herein shown for use for various types of anti-friction bearings and may be manufactured as a unit and subsequently assembled with the anti-friction elements themselves and the inner race. It constitutes a secure element interposed between outer and inner elements and is capable of practically no radial yield. The only possible radial yield is very slight and it can be at best only a small amount depending upon a further reduction of the clearance between the laminations which have already been assembled in surface to surface contact. This is controlled by the selection of material, which is substantially incompressible, the tightness of winding and the lubrication between the convolutions or on the surface of the same.

The principal resistance to axial displacement of the associated parts is the friction between the surfaces of the coils which friction can be controlled within definite limits by the same structural features named above, and held within the thrust capacity of the bearing. Thus element 12 permits axial displacement between elements 10 and 11, in the manner shown, for example, in Fig. 3 in which the element 11 and the element 10, while still substantially concentric with respect to each other, are displaced under operating loads by a substantial axial distance. This axial flexibility between the bearing proper and the housing permits the bearing to move axially with respect to the housing and prevents the localizing of extremely high pressures, thrust or otherwise, in the bearing caused by either improper tolerances in the manufacture of the parts, or irregularities which manifest themselves due to temperature or other conditions.

Figures 10, 19:
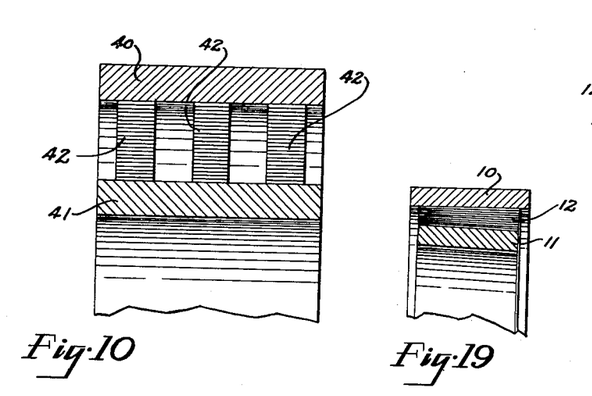
Figs. 10 and 11 are similar views showing further modifications.
Fig. 19 is a similar view showing the same under uneven loading.

The action of the coil 12 under unequally distributed radial load, due to misassembly, misalignment, inaccuracy of manufacture or the like, is shown in Fig. 19 in which the portion of the coil most heavily loaded (the left side) is compressed and the other portion remains either as wound or is oppositely displaced. This distortion of the coil shown would necessarily be grossly exaggerated for the actual conditions inasmuch as any relative movement of opposite sides of the coil can only be to the very slight extent that the load further reduces the minute clearances between the surfaces of the convolutions which are continuously in surface to surface contact, the incompressible nature of the material composing the coil preventing any other type of displacement. The action of the coil when displaced under axial pressure will be for the convolutions to move upon themselves to permit either the housing or the outer bearing race to move axially with respect to each other by movement of the convolutions of the coil over each other through an amount required for this displacement. This action is a relatively permanent displacement, the friction between the coil convolutions being sufficient to maintain the coil in this displaced condition until some force opposite in direction to the original displacing force acts upon it to return the coil to its original condition. In this respect the coil which represents the mounting or the interposed element between housing and race member is totally different in its action from the ordinary coiled spring or rubber-like element since in both of these cases there is within the element itself a returning force equal to the force which causes the original axial displacement of the element and which acts as a constant and continuing force on the bearing element.

Radially, the characteristics of the element are different from the aforementioned resilient elements inasmuch as there is substantially no radial displacement, the elements themselves being of rigid material will be in substantially surface to surface relation and act as a solid rigid element or surface relation and act as a solid rigid element or body permitting no distortion. A further distinction between the present element and the rubber-like block employed in a similar relationship is that a rubber-like block is a monolithic structure having a definite relationship governing displacement in complementary directions depending upon the amount of rubber acted upon by radial or axial pressure while in the present element there is a very considerable axial displacement possible and practically no radial displacement and there is no structural relation between the two.

Figure 1:
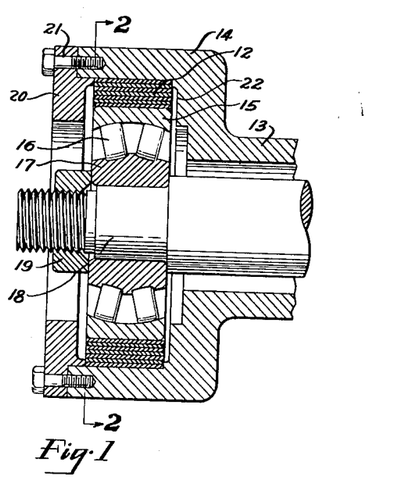
Fig. 1 is a longitudinal central section through an anti-friction bearing and housing therefor, embodying therein my improved mounting.
Figure 2:
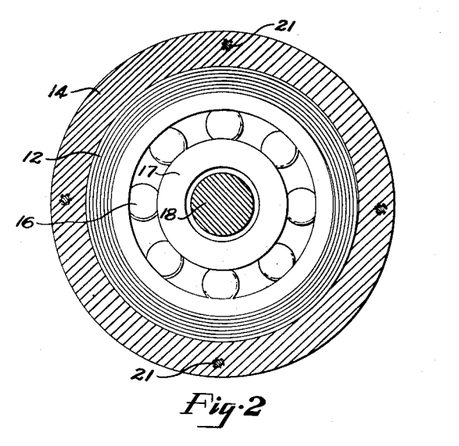
Fig. 2 is a section on the line 2—2 of Fig. 1.
Figure 3:
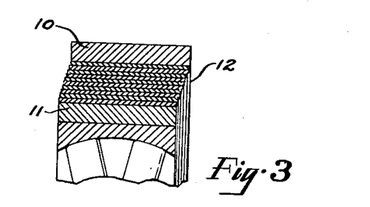
Fig. 3 is a partial enlarged and simplified transverse section through the housing mounting member and a portion of the bearing showing the same under axial displacement.
Figure 4:
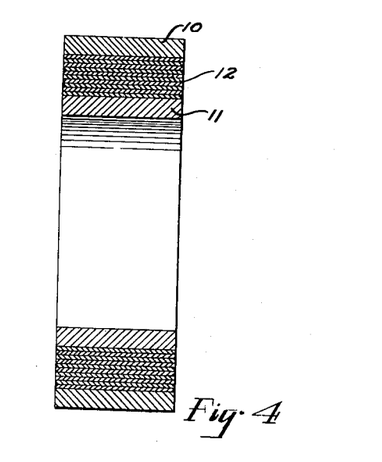
Fig. 4 is a transverse central section through the outer race of an anti-friction bearing, the mounting element and an outer collar.
Figure 5:
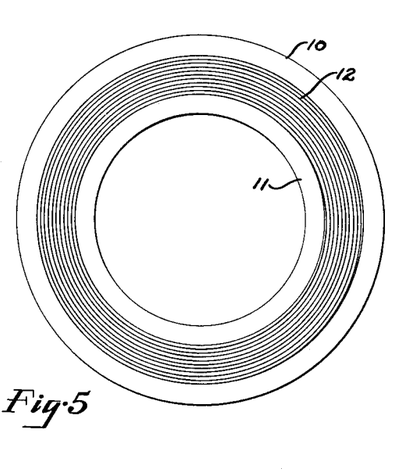
Fig. 5 is an end view of the mounting of Fig. 4.

In Fig. 1 there is shown the installation of a bearing in conjunction with the present invention within a conventional housing in which the housing 13 is provided with an enlarged portion 14 within which is received the spiral coil 12, while within the coil 12 in turn is mounted the outer race 15, antifriction elements 16 and the inner race 17 of an anti-friction bearing construction. The inner race 17 is, of course, fitted over and is secured to the shaft 18 and is locked thereon by means of a suitable nut 19, or other suitable fastening means. On the open end of the enlarged portion 14 of the housing is a flange 20 suitably secured thereto by bolts 21 and complementing the inner portion 22 of the housing enlargement, these two portions, 20 and 22, being spaced from the convolutions of the coil 12 except at their extreme outer circumference where they engage against the outermost one or more of convolutions of the element 12.

Figure 6:
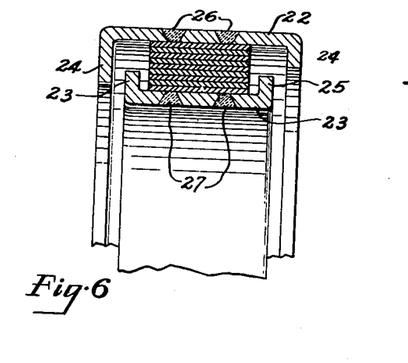
Fig. 6 is a partial central transverse section showing a modified form of outer collar and inner collar of a mounting unit with the mounting element interposed and secured therebetween.

Various modifications of the present construction may be employed, such for example as those shown in Figs. 6 to 16. In Fig. 6 there are outer and inner members 22 and 23 of unequal width, with the outer member having flanges 24 overlapping the flanges 25 of the inner member with the coil welded at its ends at the points 26 and 27 to the members 22 and 23 respectively.

Figure 7:
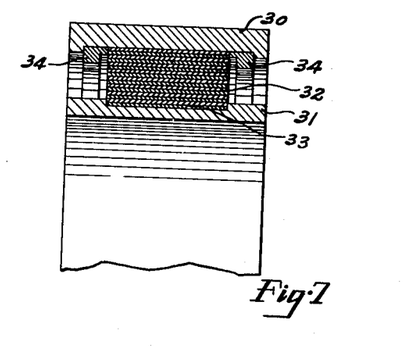
Fig. 7 is a similar view of a further modification of the mounting unit.

In Fig. 7 there is shown an outer collar 30 and inner collar 31 and an interposed coil 32. The coil 32 is substantially the coil 12 of the figures already described. This coil is mounted within an encircling recess 33 in the member 31 and is located on the outer member 30 by means of split snap rings 34. In this assembly the action is exactly that already described, that is the interposed coil 32 acts as a nearly rigid radial intermediate member between the outer and inner elements 30 and 31 while permitting longitudinal axial displacement of these two members in either direction with respect to each other.

Figure 8:
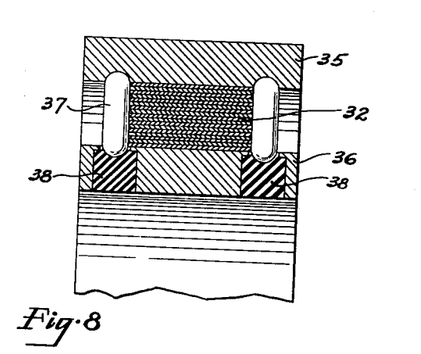
Figs. 8 and 9 are similar views of a further modification, Fig. 8 showing the assembly in normal position and Fig. 9 in displaced relationship between inner and outer members.
Figure 9:
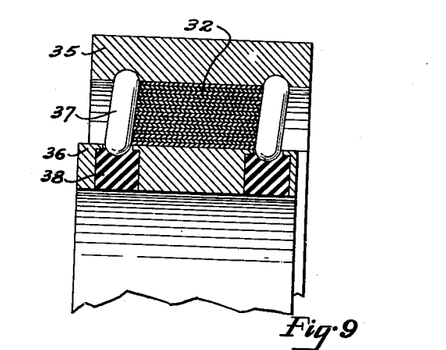

In Figs. 8 and 9 I have shown a similar construction in which, however, the coil 32 interposed between outer member 35 and inner member 36 is partially restrained from axial movement or slight wandering of one coil with respect to another by means of spring rings 37 received in suitable grooves in the inner face of the member 35 and mounted against rubber spring members 38 mounted in radial openings or slots in the inner member 36. This construction also permits substantially the equivalent axial displacement under proper load with the rings tending to maintain the convolutions in aligned relation as they are displaced axially with respect to each other and also causing a return of the entire assembly to the original relationship when acted upon by a load similar to that which produced the displacement in the first place but acting in the opposite direction.

In Fig. 10 I have shown a collar member or outer member 40, a corresponding cylindrical member 41 representing the outer race of an anti-friction bearing structure or a member into which the outer race of such a structure may be press fitted, and a plurality of spaced coils 42 interposed between the members 40 and 41 and maintaining the same in spaced concentric relation. This structure would be useful in situations where relatively long races were required or where two or more bearings would be employed side by side to carry an extremely heavy load. In this case the coils 42 could be alternately reversely wound regardless of the number of coils employed, which would produce a more uniform action in the entire assembly.

Figure 11:
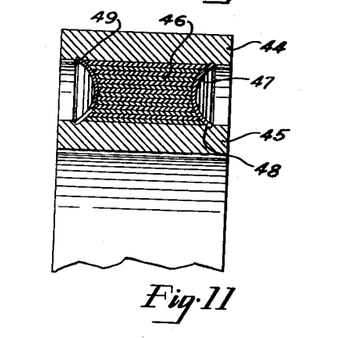
Figure 14:
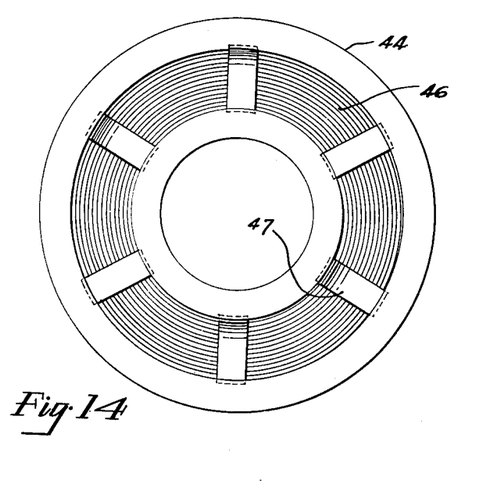
Fig. 14 is an end view of the device of Fig. 11.

The structure shown in Figs. 11 and 14 comprises an outer collar 44 and an inner collar 45 with a coil 46 compacted therebetween, which coil is similar to coil 12 but it is tapered in width from the outside to inside to a narrower central portion and the coil is maintained in place by arcuate spring clips 47. The clips 47 have their ends in grooves 48 and 49 formed in collars 45 and 44, respectively, and the ends are pivotally retained in the grooves by the tension of the clips. The clips are curved in conformation with the cross-sectional contour of the coil 44 and the pivotal mounting of the clips permits reciprocal axial displacement of the collars while maintaining the layers of the coil in proper alignment.

Figure 12:
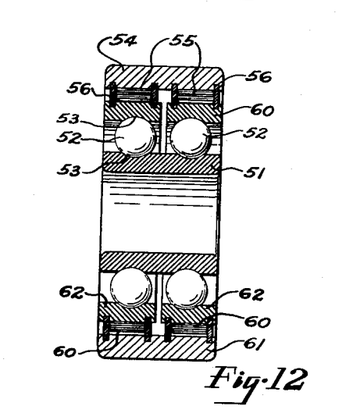
Figs. 12 and 13 are similar views showing other modifications of the present invention.

In Fig. 12 there is shown a ball bearing assembly consisting of an outer race 50 split into two parts and inner race 51 and two rows of balls 52 received in ball shaped grooves 53 formed in the opposing faces of the inner and outer races so that each portion of the outer race is individually loaded radially by its respective set of balls. In this assembly the two outer races 50 mounted side by side are again mounted within an outer element or housing 54 by means of the interposition between the element 54 and two outer races 50 of two coils 55, each of which is retained in position by means of springs or snap rings 56 mounted against the edges of the coils. The use of separate outer races in connection with my invention permits of a more even distribution of the load than in conventional bearing assemblies, while permitting necessary automatic axial adjustment as required.

Figure 13:
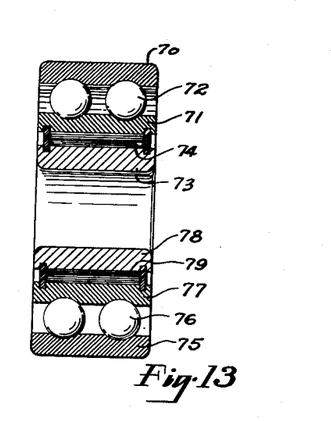

In Fig. 13 I have shown substantially the same constructions as in Fig. 12 except that in Fig. 13 there is an outer race 70, an inner race 71, intermediate anti-friction elements in the form of balls 72, and a second inner member 73 adapted to be mounted upon and about the shaft and secured to the inner member 71 by means of a coil 74 which, in this connection, extends the entire axial length of the assembly instead of being two separate coils in the forms of Fig. 12.

Figure 16:
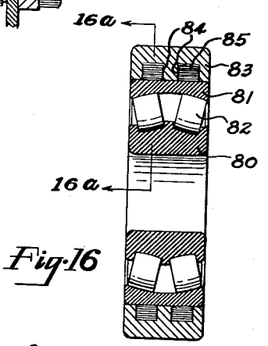
Figs. 16 and 17 are similar views showing further modifications of the present invention.
Figure 16A:
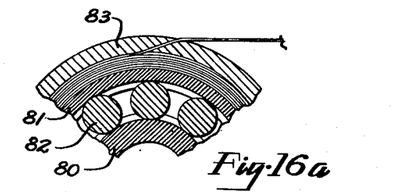
Fig. 16a is a view in section taken on line 16a—16a of Fig. 16, showing the coil being wound to the bearing.

In Fig. 16 there is shown an anti-friction bearing provided with inner and outer races 80 and 81, respectively, and two rows of interposed anti-friction elements 82 so mounted as to resist both radial and axial thrust. This entire assembly is mounted within an outer container 83 which may be either the housing proper or an element adapted to be fitted into a housing. This element 83 is provided with two spaced, parallel circumferential pockets 84 in which are mounted coils 85 secured at their inner end to the member 81, said coils being reversely wound and having their outer ends yieldingly secured in the member 83, so that any tendency of the race 81 to rotate in either direction is at once resisted by the drawing of the free end of one coil into the space within the member 83, producing an enlargement of the coil and a tightening of the same within the element.

Figure 17:
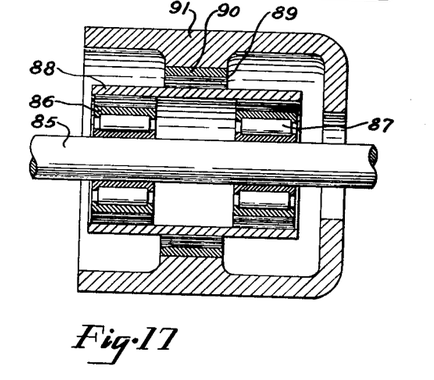
Figure 18:
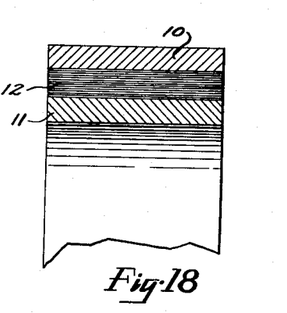
Fig. 18 is a longitudinal section showing my invention applied to a sleeve bearing.

In Fig. 17 there is shown a construction adapted to both mount and support the shaft 85 by means of two spaced anti-friction bearings 86 and 87, which are in turn mounted within a single outer element 88 having length equal to the combined axial widths of the two bearings and the space therebetween. This entire assembly in turn then is mounted within a coil 89 which in turn is secured within a sleeve 90, the sleeve being mounted within an outer housing 91. In such a construction not only is provision made for each of the two bearing mountings or assembiles separately but the coil 89 also acts as an equalizing device, equalizing load distribution between two spaced bearings.

Figure 15:
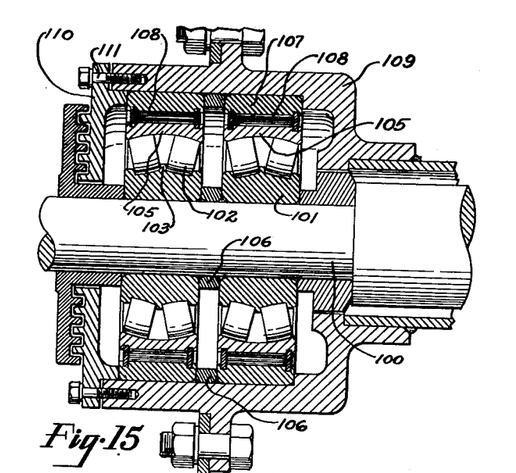
Fig. 15 is a complete central transverse section showing the present invention as embodied in a double roller bearing construction.

In Fig. 15 I have shown a typical assembly for heavy duty operation of a pair of double bearings, each of the types capable of resisting both radial and axial loads combined in a single housing and supporting and journalling the shaft 100. Mounted about the shaft 100 in spaced relation are inner races 101 of the two bearing assemblies. Operating on the outer faces of these faces are two pair of angularly related rollers 102, separated by an intermediate element 103 and operating on their outer faces against a properly curved inner face 104 of two outer race members 105. The inner races are maintained in position by means of intermediate spaced rings 106, the inner ring being mounted between the two inner races and the outer ring being mounted between two outer elements 107 which are in turn secured to the outer races 105 by coils 108. This entire assembly is fitted within a housing 109 and secured therein by means of a face plate 110 held in position by means of bolts 111.

Figure 20:
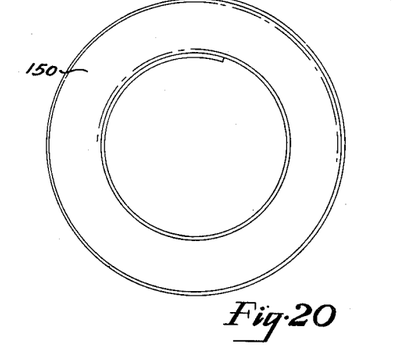
Figs. 20 and 21 are end elevations of two different forms of coils.

In Fig. 20 I have shown a coil 150 of tightly wound metallic ribbon having its outer and inner ends bonded to the contacting surfaces of the next adjacent convolution by welding, soldering, brazing or the like. A convenient method for fixing these ends is to apply a short length of fine copper wire between each end and the next adjacent convolution and then inductively heating the inner and outer convolutions briefly to melt and flow the copper and braze the desired parts together while, of course, maintaining the coil under a circumferential pressure.

Figure 21:
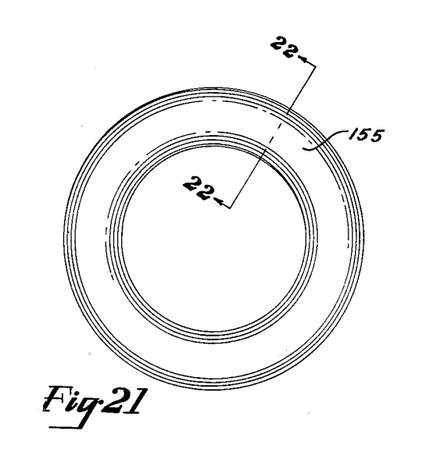
Figure 22:
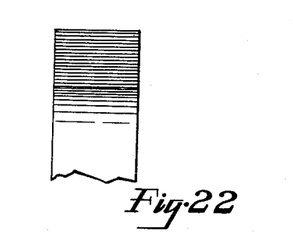
Fig. 22 is a section of the device of Fig. 21 on the line 22—22.

In Fig. 21 I have shown a coil 155 having its outer several convolutions and also its inner convolutions integrally brazed or welded together to form rigid collars of substantial thickness on the outside and inside of the coil. These joined convolutions forming the outer and inner collars may then be, and in Figs. 21 and 22 have been, finished by machining, grinding, boring etc., so they are in concentric relation without however changing the characteristics of the other unsecured layers of the coil which make up the greater part thereof.

Another form of the invention is shown in Figs. 23 to 29, in which I have shown bearing mounting unit 200 which consists of inner and outer cylindrical shells 201 and 202 having a coil of metallic ribbon 203 compacted therebetween. This ribbon may be of high carbon blue steel having a fine coating of graphite on the surfaces. In this form of the invention the shells 201 and 202 are formed of relatively light gage material so that by winding the ribbon 203 upon the inner shell a sufficient amount of the ribbon is interposed between the shells to cause contraction of the inner shell and expansion of the outer shell within the limits of elasticity of the shells whereby the shells maintain compression on the coiled ribbon at all times.

Figure 29:
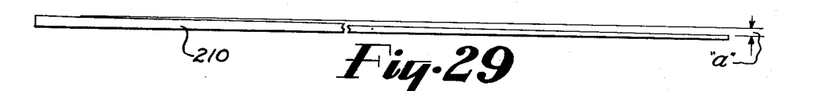
Fig. 29 is a side view of a liner strip used in the fabrication of the mounting units shown in Figs. 23 and 27.

In this form of the invention the shells may be formed of sheet metal stampings having downturned flanges 205 and 206 and upturned flanges 207 and 208, respectively. In order to cause uniform pressure to be exerted about the coiled strip the outer surface of the shell 201 and the inner surface of shell 202 each has attached thereto a liner 210 and 211, respectively. The liners are each formed of a strip, one of which is shown in Fig. 29 which is machined or otherwise formed so that it tapers from one end to the other, the amount of taper being equal to the thickness of the ribbon composing the coil 203 and which is indicated at $a$. These liner strips are then attached to respective surfaces of the shells as by rivets or welding, the adjacent ends of each strip being spaced apart slightly.

Figures 23, 24, 25, 26:
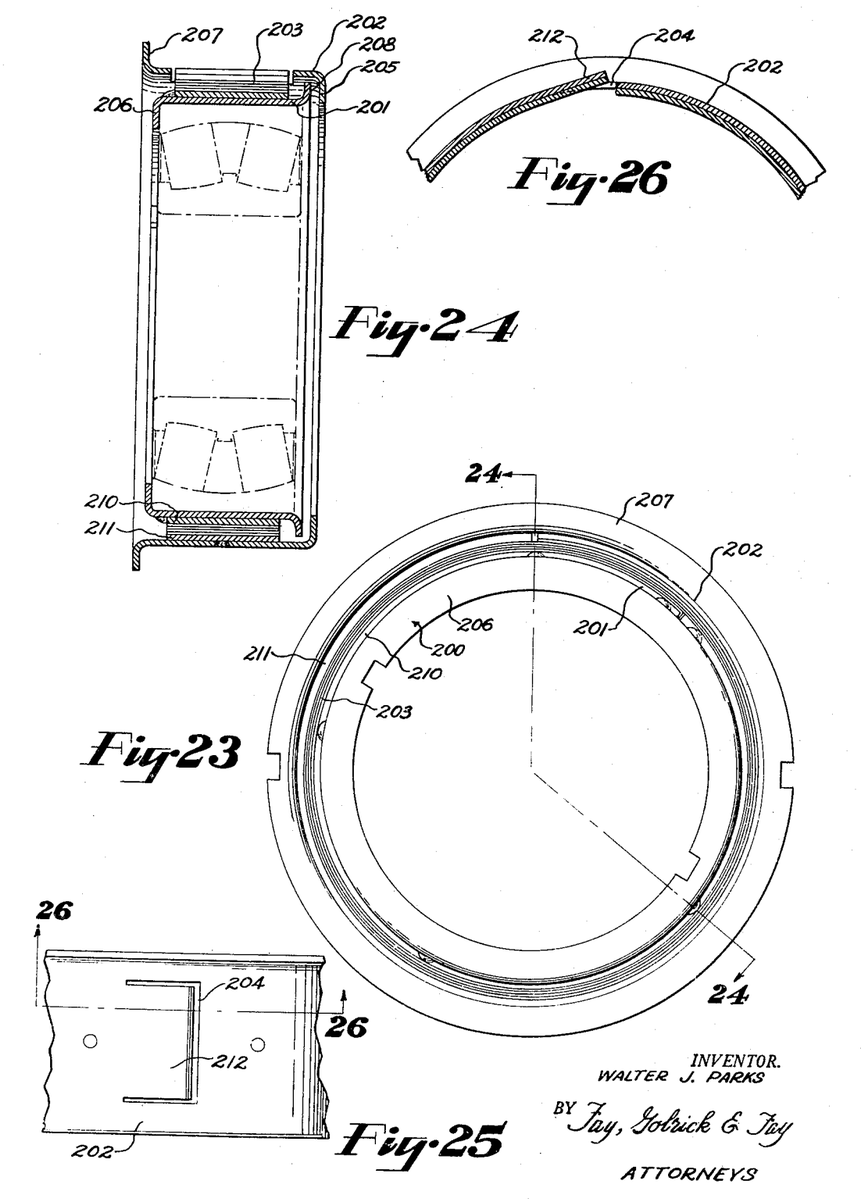
Fig. 23 is an end view in elevation of another form of a mounting unit which may be used to mount an anti-friction bearing in its housing, for example.
Fig. 24 is a view in section taken on line 24—24 Fig. 23.
Fig. 25 is a fragmentary top view of the outer shell of the unit shown in Fig. 23.
Fig. 26 is a view in section taken on line 26—26 of Fig. 25.
Figure 27:
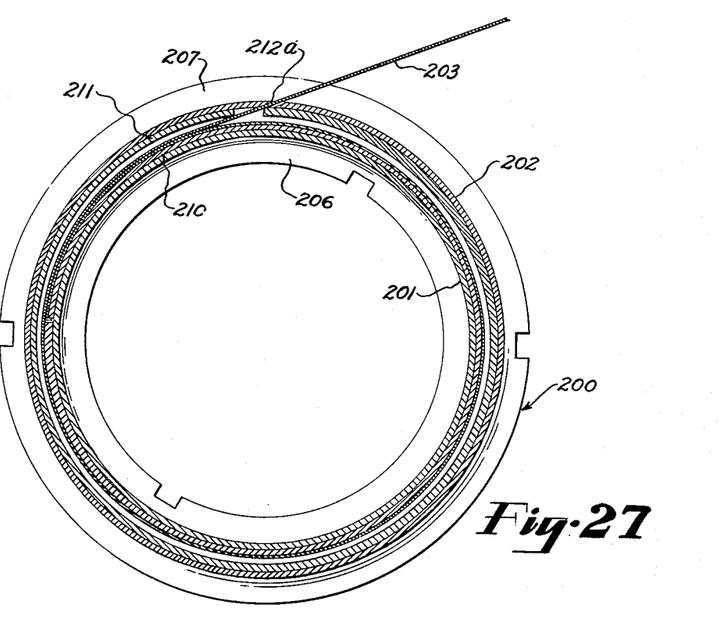
Fig. 27 is a view in section of a form of bearing mounting unit similar to the unit shown in Fig. 23 but showing the unit in the process of being fabricated.
Figure 28:
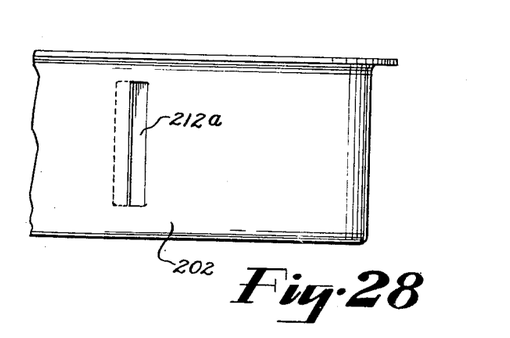
Fig. 28 is a fragmentary top view of the mounting unit shown in Fig. 27.

In making up the mounting unit 200 the shell 201 is mounted on the rotatable hub of a winding device and the outer shell 202 is held stationary in a suitable fixture. The flanges 206 and 207 are notched for attaching the shells to the hub and fixture, respectively. The outer shell is provided with a slot through which the ribbon 203 is extended and this slot may be formed by cutting a tongue 212 in the outer shell and bending the tongue outwardly, as shown in Fig. 26, or the slot may be formed by cutting a diagonal opening in the outer shell as indicated in 212a in Figs. 27 and 28. The end of the ribbon 203 inserted between the shells is secured between the ends of the inner liner 210 and if desired this end part may be riveted or welded or otherwise anchored, to the liner. The ribbon is then wound on shell 201 by turning the winding hub and it should be noted that the ribbon is initially wound at the thin portion of the liner so that the second layer will rest on a substantially true cylindrical surface. During the winding any desired tension may be placed upon the ribbon 203 so that the coiled form between the shells will be more or less compact, as desired. As the space between the shells is filled with the coiled ribbon the ribbon will compress the inner shell 201 and expand the outer shell 202 a slight amount and this contraction and expansion will maintain substantial compression on the coil throughout the use of the mounting unit. When the space between the shells has been filled with the ribbon so that it forms a compact body, it is severed at the slot in the outer shell and drawn entirely within the shell. When the slot is formed by the tongue 211, the tongue is then forced downwardly to conform with the periphery of the outer shell. The outer end of the ribbon may then be firmly attached to the adjacent liner or shell by any suitable method such as brazing or welding. It may be desirable, however, to attach the strip or ribbon to the liners by an adhesive which would obviate the application of appreciable heat to the parts which might effect the temper thereof. The liner 211 must be mounted so that the space between its adjacent ends is in registration with the slot in shell 202 and the thin end of the liner extends along the ribbon entering between the shells. The liner 211 thus provides a surface which engages substantially the entire periphery of the coil 203 and provides a uniform support for the coil. By this method of constructing the unit the compression on the coiled ribbon will firmly maintain the components in a unitary structure which may then be handled as a unit. The shells are then machined to the precise inside and outside diameters of the unit for installation of a bearing in its housing, as is indicated in broken lines in Fig. 24. Another feature of this method of fabrication is that it is not necessary to predetermine the precise length of ribbon to be used in each unit nor to provide precise outside and inside diameters of the inner and outer shells, respectively.

One model of a bearing mounting unit made in accordance with the preceding described method consisted of an inner shell having an outside diameter of approximately 8½" and the inside diameter of the outer shell was approximately 9½". The ribbon was of high carbon blue steel .010" thick, 2¼" wide and there were thirteen convolutions in the coil. The ribbon was coated with a thin film of graphite for lubrication between the laminations of the coil. The inner shell was turned on a spindle driven by a worm gear reduction drive having a 16 to 1 ratio and being driven manually by a crank having a two-foot throw. The coil was drawn as tightly as it could be manually with the power reducer described. In test, the radial load of 8000 lbs. caused a deflection of .002" and an axial thrust of only 625 lbs. caused an axial displacement of .032" between the inner and outer shells.

The foregoing invention in its simplest form provides a means for taking up slight radial irregularities of assembly or manufacture or operation, permitting a still greater amount of axial movement or freedom between the bearing and its housing and of equalizing the load over the parts or elements of a bearing. In use with two or more bearings the invention has the same properties as those above described with the additional property of evenly distributing the load between several individual bearings constituting a combination or entire assembly interposed between the shaft and the housing in which it is carried. The invention obviously has an extremely wide range of capacity since there is little or no radial deflection under varying loads and the axial yield in the coil interposed between bearing and housing can be varied within wide axial limits by the selection of various materials having in turn various surface coatings, by the tightness of the winding of the coil, by the number of convolutions in the coil, by its width with respect to the dimensions of the bearing and by the lubrication supplied between the convolutions of the coil, and can, in fact, be so made as to provide a very considerable axial yield between bearing and housing.

While I have here shown cylindrical, that is, sleeve type of bearings, ball bearings and roller bearings of certain constructions, it will be readily understood that the present invention is applicable to practically all types of bearings now in use to secure the results already described and is also easily adapted to various combinations of bearings and assemblies for various purposes.

The material of which the coil is formed in the present invention will, of course, be determined by the particular nature of the service in the assembly for which the coil is designed and in most cases will be formed of a metal strip of high tensile strength either coated or uncoated but obviously may, particularly for light service, be formed of other materials such, for example, as a synthetic resin, having the hard substantially incompressible nature. This may in fact be any material having the required tensile, compression, frictional and fatigue characteristics required for the service for which it is intended. The thickness of the strip may vary according to the space requirements so that a plurality of laminations can be provided which will gain the desired axial movement between the bearing and its support. In the description of the invention, the coiled strip has been referred to as a ribbon, but it is to be understood that in some cases the strip may be relatively rigid and therefore possess less of the characteristics of a ribbon.

Other means of employing the principle of the invention may be employed instead of the means explained, change being made as regards to the structure herein disclosed, provided the means stated by the following claims or the equivalent of such stated means be employed.

I, therefore, particularly point out and claim as my invention:

1. The method of forming a bearing mounting which is radially rigid and axially flexible which consists of taking two generally cylindrical members, sections of which in the axial direction are concentric shells and the ends of which are arranged to permit limited axial movement, forming an opening in the wall of the concentric portion of the outer shell, inserting at least one strip of material in said cylindrical shell, said strip having a taper formed longitudinally thereof in thickness which is approximately equal to the thickness of a predetermined strip, and winding a strip on the inner shell forming a plurality of layers until the strip completely fills the space remaining between the concentric shells, causing compression and tension in the inner and outer member respectively, and then severing the strip at the opening.

2. The method of forming a bearing mounting which is radially rigid and axially flexible, which consists of taking two generally cylindrical members, portions of which in the axial direction are concentric shells and the ends of which are arranged to permit limited axial movement, forming an opening in the outer wall of the concentric portion of the shell, forming similar spirally shaped surfaces in the form of tapers along the oppositely disposed circumferential surfaces of the shells, inserting at least one strip of material within said shell and winding the strip on the inner shell forming a plurality of layers until the strip completely fills the space between the shells, causing compression and tension in the inner and outer member respectively, and until the shells and wound strips are in substantial surface to surface contact with one another, and then severing the strip at the opening and drawing the same within the shells to the end of tapered spirally shaped surfaces.

3. The method of forming a bearing mounting which is radially rigid and axially flexible which comprises taking two members, axial sections of which are cylindrical shells substantially concentric with one another, and the ends of which are arranged to permit limited axial movement, forming an opening in the wall of the substantially concentric portion of the outer shell, inserting a strip of material therethrough and anchoring the same to the inner shell, and then winding the strip on the inner shell forming a plurality of layers, until the strip completely fills the space between the concentric shells, causing compression and tension in the inner and outer member respectively, so that the parts are rigid radially relative to one another and flexible axially, then severing the strip at the opening.

WALTER J. PARKS.

(References on following page)

References Cited in the file of this patent

UNITED STATES PATENTS

| Number | Name | Date |
|---|---|---|
| Re. 19,320 | Purdy | Sept. 18, 1934 |
| 1,370,599 | Leon | Mar. 8, 1921 |
| 1,486,109 | David | Mar. 4, 1924 |
| 1,594,526 | Hume | Aug. 3, 1926 |
| 1,873,245 | Abegg | Aug. 23, 1932 |
| 1,894,595 | Mitchell | Jan. 17, 1933 |
| 1,899,343 | Mackey et al. | Feb. 28, 1933 |
| 2,263,820 | Rippingile | Nov. 25, 1941 |
| 2,244,197 | Hessler | June 3, 1941 |
| 2,467,489 | McClain | Apr. 19, 1949 |
| 2,478,030 | Vienneau | Aug. 2, 1949 |
| 2,532,327 | Parks | Dec. 5, 1950 |